E. G. MATTOON.
GRADOMETER.
APPLICATION FILED AUG. 28, 1917.
1,257,090.
Patented Feb. 19, 1918.
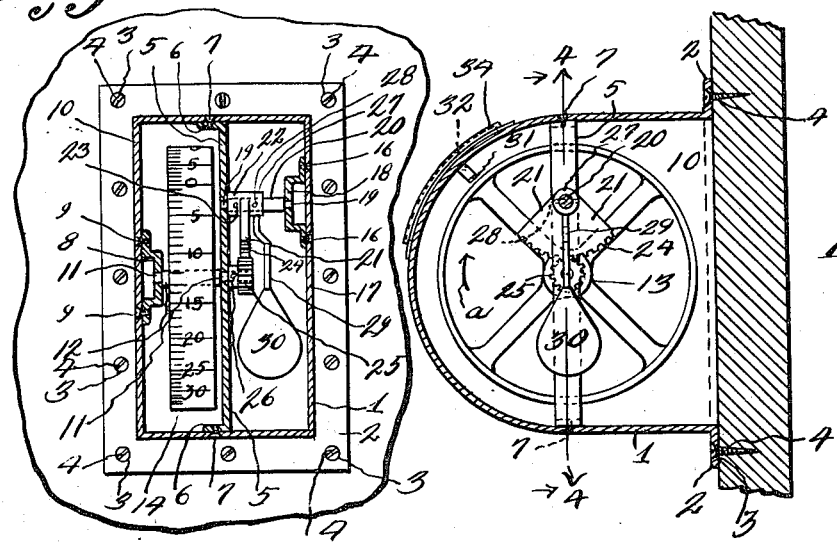
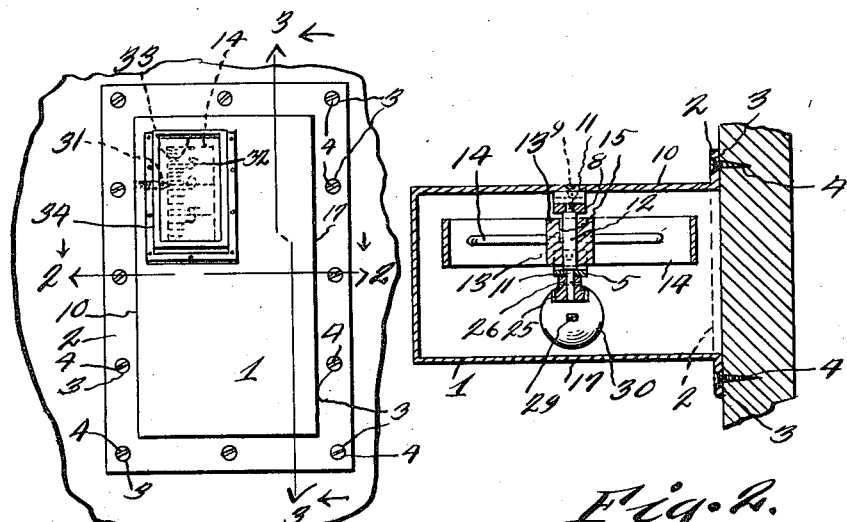
Witnesses
Philip Ferrell
Francis L. Powell
Inventor
E. G. Mattoon
By D. Swift & Co.
Attorney

UNITED STATES PATENT OFFICE.

ELBERT G. MATTOON, OF INDEPENDENCE, COLORADO.

GRADOMETER.

1,257,090.

Specification of Letters Patent.   Patented Feb. 19, 1918.

Application filed August 28, 1917.   Serial No. 188,666.

*To all whom it may concern:*

Be it known that I, ELBERT G. MATTOON, a citizen of the United States, residing at Independence, in the county of Teller, and State of Colorado, have invented a new and useful Gradometer; and I do hereby declare the following to be a full, clear, and exact description of the invention, such as will enable others skilled in the art to which it appertains to make and use the same.

This invention relates to an improved gradometer, an instrument particularly adapted for measuring the dip, inclination or the grade of a road bed, and more particularly to a device especially adapted for attachment to a vehicle, preferably motor driven, whereby the driver may readily observe or note the incline or decline of the road bed.

One of the objects of the invention is the provision of a very simple, cheap and efficient device of this kind, and consisting of very few parts, and adapted to be attached to the dash board of the vehicle, so as to present to the observer or driver a graduated perimeter of a drum, so as to disclose the angle of inclination or grade of the road bed.

A further object of the invention is the provision of a device of this kind which is very simple in construction and consequently not liable to become out of order, and in which the parts may be easily repaired or replaced when necessary.

A further object of the invention is to provide a device of this kind which may be manufactured at a small cost and sold at a reasonable profit.

In practical fields the details of construction may necessitate alterations falling within the scope of what is claimed.

The invention comprises further features and combination of parts as hereinafter set forth, shown in the drawings and claimed.

In the drawings:—

Figure 1 is a view in front elevation of the improved gradometer constructed in accordance with the invention.

Fig. 2 is a sectional view on line 2—2 of Fig. 1.

Fig. 3 is a sectional view on line 3—3 of Fig. 1.

Fig. 4 is a sectional view on line 4—4 of Fig. 3.

Referring more especially to the drawings, 1 designates a suitable casing, which may be any suitable shape, size or configuration, and is provided with a marginal flange 2, having apertures 3 for the reception of screws 4, for securing the casing to the front dash of a vehicle, preferably motor driven. Mounted in this casing perpendicularly is a bar 5, the ears 6 at its ends receiving screws or the like 7 for securing the bar in place A U-shaped plate 8 is secured by screws 9 to the inner face of one of the disk walls 10 of the casing. Mounted in bearings of the U-shaped plate 8 and the bar 5 are the pintles 11 of the shaft 12, on which the hub 13, of the wheel drum 14 is splined by means of a feather 15, and the perimeter of this wheel drum is provided with graduations, leading from a zero indication toward opposite sides, from 5 to 30 inclusive. Secured by screws 16 to the disk shaped wall 17 is a U-shaped plate or bracket 18. In a bearing in the bracket 18 and in a bearing in the bar 5 pintles 19 of a rock shaft 20 are mounted. A segment 21 has its hub 22 secured by a pin 23 on the shaft 20. This segment has teeth 24 meshing with the teeth of a pinion 25, the hub of which is secured by a pin 26 on one of the pintles of the shaft 12. A collar 27 is secured by a pin 28 on the shaft 20 adjacent the hub end of the segment. Projecting radially and downwardly from the collar 27 is an arm 29, its lower end being provided with a weight 30. It will be observed that when the vehicle, (on the dash board of which the gradometer is mounted) is climbing an inclined road bed, the weight 30 will oscillate, which will impart movement to the drum in the direction of the arrow *a*, through the medium of the segment and the pinion, and wherever a graduation on the perimeter to one side of the zero indication, stops adjacent the indicator or pointer 31, the angle of the inclination will be indicated. Upon descending an inclination in the road bed, a reverse movement of the drum will be accomplished, whereby an indication on the other side of the zero mark will stop opposite the pointer, thus noting the angle of the decline. The reading of the indications on the perimeter of the drum, can be made through the glass cover 32, which covers the opening 33 in the perimeter of the casing 1, and which glass cover is held in place by the rectangular frame 34, which is secured to the casing 1, as shown clearly in Figs. 1 and 3.

The invention having been set forth what is claimed as new and useful is:—

In a gradometer, a casing adapted to be secured to the dash board of a vehicle, said casing having a central perpendicular bar, a shaft mounted in bearings respectively on one flat face of the casing and in said bar and provided with a wheel drum, the perimeter of the drum having calibrations extending on either side of a zero indication, one end of said shaft having a pinion, a second shaft mounted in bearings respectively on the opposite flat wall of the casing and in said bar and disposed above the first shaft, a segment suspended from and rockable with the second shaft and meshing with said pinion, a collar secured on the second shaft, an arm extending downwardly from said collar and having a weight at its lower end, and adapted to oscillate to one side or the other corresponding to an inclination in the road bed, whereby said drum may be rocked in one direction or the other, and a pointer on said casing to indicate the angle of the inclination on said drum.

In testimony whereof I have signed my name to this specification in the presence of two subscribing witnesses.

ELBERT G. MATTOON.

Witnesses:
DENNIS E. WEAVER,
G. O. BUTLER.